United States Patent
Hahm et al.

(10) Patent No.: US 9,333,721 B2
(45) Date of Patent: May 10, 2016

(54) MULTIPLE FIBER SPINNING APPARATUS AND METHOD FOR CONTROLLING SAME

(75) Inventors: Wan-Gyu Hahm, Yongin-si (KR); Sung Won Byun, Seoul (KR); Dae Young Lim, Yongin-si (KR); Min Sun Kim, Gunpo-si (KR); Byeong Jin Yeang, Hwaseong-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 479 days.

(21) Appl. No.: 13/638,276

(22) PCT Filed: Nov. 16, 2011

(86) PCT No.: PCT/KR2011/008749
§ 371 (c)(1),
(2), (4) Date: Oct. 31, 2012

(87) PCT Pub. No.: WO2012/067420
PCT Pub. Date: May 24, 2012

(65) Prior Publication Data
US 2013/0200544 A1     Aug. 8, 2013

(30) Foreign Application Priority Data

Nov. 16, 2010 (KR) .................. 10-2010-0114007
Nov. 16, 2010 (KR) .................. 10-2010-0114008

(51) Int. Cl.
*D01F 8/06*     (2006.01)
*B29D 99/00*    (2010.01)
*D01D 4/06*     (2006.01)
(Continued)

(52) U.S. Cl.
CPC .............. *B29D 99/0078* (2013.01); *D01D 4/06* (2013.01); *D01D 5/088* (2013.01); *D01D 5/28* (2013.01)

(58) Field of Classification Search
CPC ........... D01D 5/082; D01D 5/28; D01D 5/08; D01D 4/06; D01D 1/06
See application file for complete search history.

(56) References Cited

U.S. PATENT DOCUMENTS

| 3,559,237 | A | * | 2/1971 | Biggelaar et al. | ........ D01D 1/06 264/172.14 |
| 5,919,410 | A | * | 7/1999 | Jeng | ................................ 264/78 |
| 6,183,684 | B1 | * | 2/2001 | Lu | ........................ D01D 5/0985 264/103 |

(Continued)

FOREIGN PATENT DOCUMENTS

| JP | 2003-020514 | 1/2003 |
| JP | 2005-009009 | 1/2005 |

(Continued)

*Primary Examiner* — Galen Hauth
(74) *Attorney, Agent, or Firm* — D. Peter Hochberg; Sean F. Mellino

(57) ABSTRACT

A multiple fiber spinning apparatus and a method of controlling the same. The apparatus includes an extruding unit, a spin block unit and a spinning nozzle unit. The extruding unit includes extruders that melt, extrude and transfer polymer materials. The spin block unit includes a gear pump unit which has gear pumps connected to each of the extruders. The gear pumps receive the polymer materials from the corresponding extruders and discharge the polymer materials. The spin block unit further includes a flow passage unit which has flow passages connected to the respective gear pumps. The spinning nozzle unit includes spinning nozzles, each of which is connected to one of the gear pumps of each extruder by the corresponding flow passage, so that each spinning nozzle receives the molten polymer materials and spins the polymer materials into a fiber.

13 Claims, 11 Drawing Sheets

(51) Int. Cl.
*D01D 5/088* (2006.01)
*D01D 5/28* (2006.01)

(56) References Cited

U.S. PATENT DOCUMENTS

| | | | | |
|---|---|---|---|---|
| 6,723,265 | B1* | 4/2004 | Osaka et al. | 264/103 |
| 7,172,399 | B2* | 2/2007 | Reutter | D01D 1/09 264/169 |
| 2002/0114598 | A1* | 8/2002 | Bodaghi | 385/123 |
| 2004/0219358 | A1* | 11/2004 | Tokarsky | D01D 4/00 428/364 |
| 2010/0015266 | A1* | 1/2010 | Schutt | D01D 1/06 425/72.2 |

FOREIGN PATENT DOCUMENTS

| | | |
|---|---|---|
| JP | 2009-174075 | 8/2009 |
| KR | 10-2005-0105672 | 11/2005 |
| KR | 10-2007-0047873 | 5/2007 |

\* cited by examiner

MULTIPLE FIBER SPINNING APPARATUS AND METHOD FOR CONTROLLING SAME

CROSS-REFERENCE TO RELATED APPLICATIONS

This application is a National Stage application of International Application No. PCT/KR2011/008749, filed on Nov. 16, 2011, which claims priority of Korean application Serial Number 10-2010-0114007 filed on Nov. 16, 2010 and Korean application Serial Number 10-2010-0114008 filed on Nov. 16, 2010, all of which are incorporated herein by reference in their entireties.

BACKGROUND OF THE INVENTION

1. Field of the Invention

The present invention relates, in general, to multiple fiber spinning apparatuses and methods of controlling the same and, more particularly, to a multiple fiber spinning apparatus which can produce a fiber containing multiple kinds of polymers, and a method of controlling the same.

2. Description of the Prior Art

Generally, a melting conjugate spinning apparatus is an apparatus for spinning a fiber that has a predetermined cross-sectional shape in such a way that polymers with different characteristics are input into two or more melting extruders, are melted under high temperature and high pressure, and then are combined with each other in a pack provided with several distribution plates and nozzles.

A fiber produced by the melting conjugate spinning apparatus refers to a conjugate fiber (a conjugate fiber yarn). The cross-sectional shape of the conjugate fiber can be a sheath-core, side-by-side or sea-islands type because it is formed by conjugate-spinning different kinds of polymer raw materials. Moreover, after such a melting conjugate spinning apparatus spins the same kind or different kinds of polymer raw materials into fibers that have different properties (strength, elongation, etc.), deniers and cross-sectional shapes (a circular shape, a '+' shape, a Y-shape, a '−' shape, a hollow shape, etc.), the produced fibers may be intermingled through a separate process. A fiber that is produced by this method is called an intermingled fiber (an intermingled fiber yarn).

However, in the case of the intermingled fiber, different raw fibers must be separately produced before they are intermingled through a separate process. Therefore, the work of producing the intermingled fiber is complex, thus reducing the productivity, and increasing the production cost. Particularly, the conventional melting conjugate spinning apparatus cannot produce a multiple conjugate fiber containing three or more kinds of polymer raw materials. Therefore, there is a limit as to the functions and characteristics that can be applied to a fiber.

SUMMARY OF THE PRESENT INVENTION

Technical Problem

Accordingly, the present invention has been made keeping in mind the above problems occurring in the prior art, and an object of the present invention is to provide a multiple fiber spinning apparatus which can spin three or more kinds of polymer raw materials into a fiber, thus making it possible to produce conjugate fibers or intermingled fibers that have a variety of patterns and cross-sectional structures, and a method of controlling the multiple fiber spinning apparatus.

Another object of the present invention is to provide a multiple fiber spinning apparatus which has an improved flow passage structure so that a heating device that is able to generate high-temperature and high-pressure heat and has high thermal transfer efficiency can be used.

A further object of the present invention is to provide a multiple fiber spinning apparatus in which flow passages, gear pumps and spinning nozzles are designed such that three or more polymers can be spun into a fiber, and which is configured so that heat is efficiently applied to the flow passages so that the polymers can be effectively melted.

Yet another object of the present invention is to provide a multiple fiber spinning apparatus which can produce fibers of a variety of thicknesses because three or more kinds of polymer materials can be spun into a fiber, unlike the conventional technique which has used only an air cooling type cooling device because of the limited thickness that can be imparted to a produced fiber, and which is configured such that a cooling device that can create different thicknesses of fiber can be used.

Still another object of the present invention is to provide a multiple fiber spinning apparatus in which the flow passages are designed such that polymers can be rapidly melted and maintained in the optimal molten state, and which provides an optimum heat application method so that heat can be effectively transferred to the flow passages.

Technical Solution

In order to accomplish the above objects, in a first aspect, the present invention provides a multiple fiber spinning apparatus, including: an extruding unit comprising a plurality of extruders melting polymer materials supplied into hoppers and then extruding and transferring the polymer materials; a spin block unit, comprising: a gear pump unit comprising a plurality of gear pumps connected to each of the extruders, the gear pumps receiving the polymer materials from the corresponding extruders of the extruding unit and discharging the polymer materials at a same discharge rate or different discharge rates; and a flow passage unit comprising flow passages connected to the respective gear pumps of the gear pump unit so that the molten polymer materials are transferred through the flow passages; and a spinning nozzle unit comprising a plurality of spinning nozzles, each of which is connected to one of the gear pumps of each of the extruders by the corresponding flow passage, so that each of the spinning nozzles receives the multiple kinds of molten polymer materials and spins the polymer materials into a fiber.

The multiple fiber spinning apparatus may further include an electric heater unit enclosing the spin block unit and applying heat to the spin block unit. The electric heater unit may generate heat of a temperature ranging from 50° C. to 350° C.

The multiple fiber spinning apparatus may further include a cooling unit provided below the spinning nozzle unit, the cooling unit using either an air cooling method or a water cooling method depending on a thickness of a fiber spun from the spinning nozzle unit.

The multiple fiber spinning apparatus may further include a height adjustment unit adjusting heights of the extruding unit, the spin block unit and the spinning nozzle unit so that the corresponding cooling unit using either cooling method can be provided below the spinning nozzle unit.

In a second aspect, the present invention provides a method of controlling a multiple fiber spinning apparatus, including: (a) controlling a plurality of gear pumps so that the gear pumps connected to each of extruders discharge, at same or different discharge rates, polymer material which has been melted and extruded by and transferred from the corresponding extruder; and (b) controlling each of spinning nozzles, which is connected to the corresponding one of the gear pumps of each of the extruders, so that each of the spinning nozzles receives multiple kinds of molten polymer materials from the corresponding gear pumps and then spins the polymer materials into a fiber.

The spinning nozzles may include a first spinning nozzle and a second spinning nozzle, and (b) controlling may include controlling either the first spinning nozzle or the second spinning nozzle and spinning so that multiple kinds of molten polymer materials are spun into a multiple conjugate fiber in which the polymer materials are formed in a predetermined pattern in a single piece of fiber.

Furthermore, (b) controlling may include controlling the first spinning nozzle and the second spinning nozzle at a same time so that multiple kinds of molten polymer materials are spun into an intermingled fiber in which the polymer materials are irregularly patterned.

In a third aspect, the present invention provides a method of controlling a multiple fiber spinning apparatus, including controlling gear pumps and spinning nozzles so that each of the spinning nozzles that is connected to a corresponding one of the gear pumps connected to each of extruders receives multiple kinds of molten polymer materials that have been discharged from the corresponding gear pumps at same or different discharge rates and then spins the polymer materials into a fiber.

In a fourth aspect, the present invention provides a multiple fiber spinning apparatus having a multi-layered flow passage structure, including: a flow passage unit comprising a plurality of flow passages individually formed in a spin block unit and connected to respective gear pumps of extruders so that molten polymer materials are transferred from the corresponding gear pumps through the flow passages; an electric heater unit enclosing the spin block unit and applying heat to the spin block unit; and a spinning nozzle unit comprising a plurality of spinning nozzles, each of which is connected to the corresponding gear pumps by the corresponding flow passages so that each of the spinning nozzles receives multiple kinds of molten polymer materials and spins the polymer materials into a fiber, wherein a plurality of flow passage blocks are stacked on top of another in the spin block unit that encloses the flow passage unit, wherein the flow passages are formed in a junction between the flow passage blocks and form openings which are vertically formed through the flow passage blocks, and opposite ends of each of the flow passages are respectively connected to the corresponding gear pump and the corresponding spinning nozzle.

In a fifth aspect, the present invention provides a multiple fiber spinning apparatus, including: a flow passage unit comprising a plurality of flow passages through which high-temperature and high-pressure fluid is transferred; a flow passage block unit enclosing the flow passage unit, the flow passage block unit having a structure in which a plurality of flow passage blocks are stacked on top of another; and an electric heater unit applying heat to the flow passage block unit to melt polymer materials supplied into the flow passage unit, wherein the flow passages are formed in a junction between the flow passage blocks and form openings which extend from the junction and are vertically formed through the flow passage blocks, so that the fluid is transferred through the flow passages.

In the fourth or fifth aspect, the flow passage block (unit) may be made of a metal alloy.

Furthermore, in the fourth or fifth aspect, the electric heater unit may generate heat of a temperature ranging from 50° C. to 350° C. and efficiently transfer the heat to the flow passage blocks in the spin block unit.

Moreover, in the fourth or fifth aspect, the flow passages may be formed in the passage blocks without making contact with each other.

Advantageous Effects

A multiple fiber spinning apparatus according to the present invention includes a plurality of extruders, a plurality of gear pumps connected to each extruder, and a plurality of spinning nozzles, each of which is connected to one of the gear pumps of each extruder. The multiple fiber spinning apparatus is configured such that as necessary, the corresponding gear pumps and spinning nozzles are controlled so that multiple kinds of polymers can be spun into a fiber at the same time. Therefore, the present invention can produce a multiple conjugate fiber or intermingled fiber whose functions and performance have been improved.

Furthermore, in the present invention, the spinning nozzles can spin a single or multiple kinds of polymers into fibers that have different thicknesses and cross-sectional shapes and then may intermingle the fibers with each other. Therefore, unlike the conventional technique, the present invention can omit a separate post-process for the interminglement, thus reducing the number of processes and the process time, thereby markedly enhancing the production efficiency and reducing the production cost.

In addition, a plurality of flow passages are disposed between the gear pumps and the spinning nozzles and are formed, without making contact with each other, in flow passage blocks that are stacked on top of another. Hence, the present invention can spin multiple kinds of polymers into a fiber at the same time, thus making it possible to produce a multiple conjugate fiber or intermingled fiber that has superior function and performance.

Moreover, in the present invention, the structure of the flow passage unit is improved so that multiple kinds of polymers can be spun into a fiber. Therefore, the present invention can omit the separate intermingling process, that has been required when using the conventional conjugate spinning apparatus or melting spinning apparatus. As a result, the present invention can reduce the number of processes and the process time, thus increasing the production efficiency and reducing the production cost.

Further, the present invention is configured such that the flow passages are formed in the junction between the flow passage blocks and vertically extend therefrom to form openings that are vertically formed through the flow passage blocks. Therefore, the disassembly of the apparatus can be facilitated, thus making cleaning or maintenance of the apparatus easy.

In addition, the present invention uses an electric heater which is in direct contact with the flow passage blocks that form the flow passages so that high-temperature heat can be applied to polymers, thus enhancing thermal efficiency.

DETAILED DESCRIPTION OF THE PREFERRED EMBODIMENT

Best Mode

Figure 1:
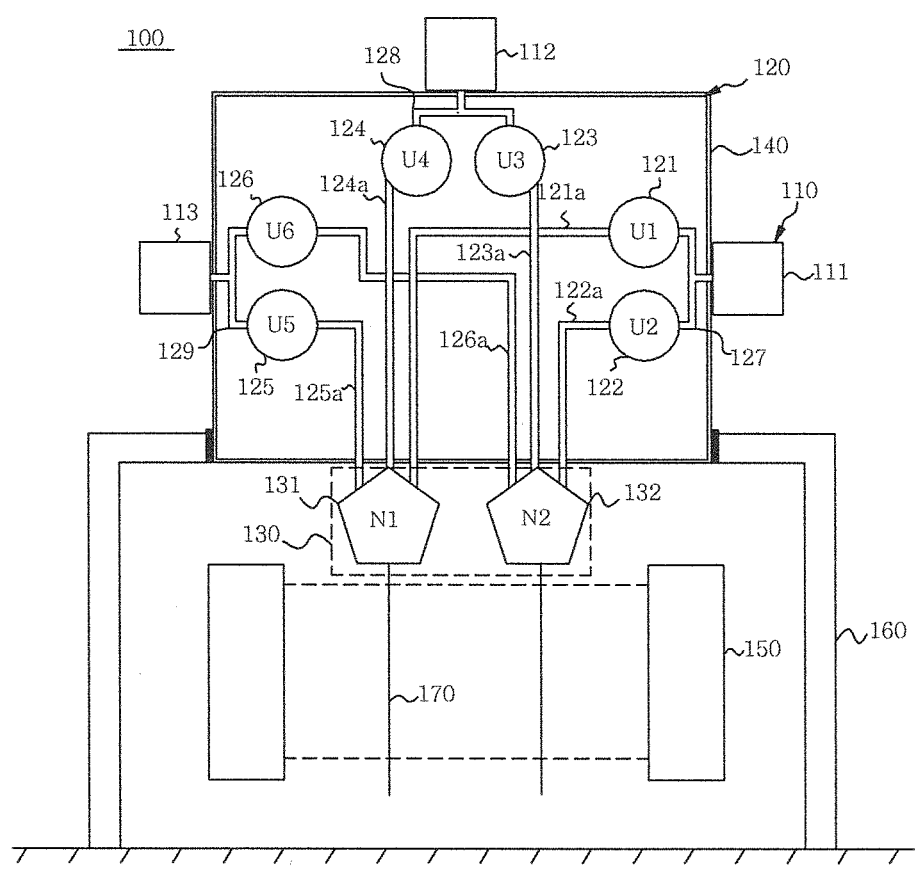
FIG. 1 is a view illustrating a multiple fiber spinning apparatus (100), according to a first embodiment of the present invention.

Hereinafter, preferred embodiments of the present invention will be described in detail with reference to the attached drawings so that those skilled in the art can easily understand the present invention. Reference should now be made to the drawings, in which the same reference numerals are used throughout the different drawings to designate the same or similar components.

The term 'multiple conjugate yarn (a multiple conjugate fiber)' which was illustrated above or will be described below refers to a fiber which contains multiple kinds of polymers in a variety of cross-sectional shapes (a sheath-core shape, a side-by-side shape, a sea-islands shape, etc.), unlike the notion of conjugate yarn (a conjugate fiber) which typically refers to a piece of fiber that contains two kinds of polymers. The term 'intermingled fiber' refers to a yarn combined with multiple kinds of polymer fibers which are made of different polymers, thicknesses, properties, cross-sections, etc.

First Embodiment

FIG. 1 is a view illustrating a multiple fiber spinning apparatus 100, according to a first embodiment of the present invention.

As shown in FIG. 1, the multiple fiber spinning apparatus 100 according to the first embodiment of the present invention includes an extruding unit (110: 111, 112, 113), a spin block unit 120, a spinning nozzle unit 130, an electric heater unit 140, a cooling unit 150 and a height adjustment unit 160.

The extruding unit 110 according to the first embodiment of the present invention melts, extrudes and transfers polymer raw materials that have been input into hoppers (not shown) disposed at the top of the apparatus. In this invention, the extruding unit 110 includes a plurality of, e.g. three extruders 111, 112 and 113 which are disposed at different positions to melt and extrude polymer raw materials and then transfer them to the spin block unit 120.

The spin block unit 120 of the present invention includes a gear pump unit (120A: 121, 122, 123, 124, 125, 126) and a flow passage unit (120B: 127, 128, 129, 121a, 122a, 123a, 124a, 125a, 126a). Here, the reference numerals 120A and 120B are not shown in FIG. 1.

First, the gear pump unit 120A will be explained. The gear pump unit 120A of the present invention includes a plurality of gear pumps 121, 122, 123, 124, 125 and 126. Among the gear pumps, the gear pumps 121 and 122 are disposed at the right side in the spin block unit 120 and supplied with a polymer raw material through the corresponding flow passage 127 from the extruder 111 that is disposed outside the right portion of the spin block unit 120.

The gear pumps 123 and 124 are disposed at an upper portion in the spin block unit 120 and supplied with a polymer raw material through the corresponding flow passage 128 from the extruder 112 that is provided outside the upper portion of the spin block unit 120. The gear pumps 125 and 126 are disposed at the right side in the spin block unit 120 and supplied with a polymer raw material through the corresponding flow passage 129 from the extruder 113 that is disposed outside the left portion of the spin block unit 120.

Each gear pump is configured such that it is connected to the corresponding flow passage and extruder so that molten and extruded polymer raw material can be supplied to the gear pump, and it is also connected to a gear motor (not shown in FIG. 1). Thanks to this connection configuration, the gear pump unit 120A of the present invention can discharge polymer raw materials, which have been melted by and extruded from the extruders 111, 112 and 113, at the same or different discharge rates with assistance from the gear motors. The words 'discharging materials at different discharge rates' means that the thicknesses of the discharged fibers are different from each other.

As such, to overcome the structural limitations of the conventional melting fiber spinning apparatus (or the conjugate fiber spinning apparatus) in which a single extruder or each of two extruders must have only a single gear pump, in the first embodiment of the present invention, three or more extruders 111, 112 and 113 are provided, and each extruder 111, 112, 113 includes two gear pumps.

However, the present invention is not limited to the construction in which the extruders 111, 112 and 113 are provided and each extruder 111, 112 and 113 has two gear pumps. In other words, a larger number of extruders and gear pumps may be provided, although the possibility of realization is low for structural reasons.

In addition, to embody the gear pump unit 120A which discharges molten polymer raw materials at different discharge rates, controllers may be provided inside or outside the spin block unit 120 to control the discharge rates of the respective gear pumps.

The flow passage unit 120B of the present invention includes a plurality of flow passages 127, 128, 129, 121a, 122a, 123a, 124a, 125a and 126a. Each flow passage is individually connected to the corresponding gear pump.

In detail, in the flow passage unit 120B, the flow passage that is designated by reference numeral 121a is provided between the gear pump 121 of U1 and a spinning nozzle 131 of N1 which will be explained later herein. The flow passage that is designated by reference numeral 122a is provided between the gear pump 122 of U2 and a spinning nozzle 132 of N2 which will be explained later herein. The flow passage that is designated by reference numeral 123a is provided between the gear pump 123 of U3 and the spinning nozzle 132 of N2. The flow passage that is designated by reference numeral 124a is provided between the gear pump 124 of U4 and the spinning nozzle 131 of N1.

Furthermore, the flow passage that is designated by reference numeral 125a is provided between the gear pump 125 of U5 and the spinning nozzle 131 of N1. The flow passage that is designated by reference numeral 126a is provided between the gear pump 126 of U6 and the spinning nozzle 132 of N2.

As such, in the present invention, the reason that the flow passage unit 120B can be configured such that one flow passage is provided between each gear pump of the gear pump unit 120A and the spinning nozzle unit 130 is because parts in which the flow passages are formed have a stacked structure, whereby the flow passages can be provided between the respective gear pumps and the corresponding spinning nozzles without coming into contact with each other, unlike the structure of the conventional technique in which only one or two gear pumps are provided and only one or two flow passages are provided between the gear pumps and a single spinning nozzle.

For example, each flow passage is formed in such a way that a semicircular flow passage portion which is half of the flow passage is formed in a first stack part, and the other semicircular flow passage portion is formed in a second stack part which is placed on the first stack part. Thereby, the flow passages can be formed as elongated between the gear pumps and the spinning nozzles without making contact with each other.

The spinning nozzle unit 130 of the present invention includes a plurality of spinning nozzles, in this embodiment, the two spinning nozzles 131 and 132. Each spinning nozzle 131, 132 is connected to the corresponding one gear pump of each extruder by the corresponding flow passage. Thus, each spinning nozzle 131, 132 is connected to three flow passages so that multiple kinds of molten polymers can be supplied from the gear pump unit 120A to each spinning nozzle 131, 132. As a result, each spinning nozzle 131, 132 spin multiple kinds of polymers into a fiber.

Although it is preferable that the spinning nozzle unit 130 include two spinning nozzles, the present invention is not limited to this. For example, if the number of gear pumps of each extruder is increased and the number of flow passages is increased in response to the number of gear pumps, the number of spinning nozzles may also be increased.

Further, to instruct the spinning nozzle unit 130 to selectively spin multiple kinds of polymer resins into a fiber, a controller (not shown) which controls the spinning nozzle unit 130 in conjunction with controlling the gear pump unit 120A may be provided inside or outside the spin block unit 120. This controller may also be used to control the electric heater unit 140, which will be explained later herein, or other elements. A fiber 170 that is spun by each spinning nozzle 131, 132 and contains multiple kinds of polymers is wound around a roller (not shown).

The electric heater unit 140 encloses the spin block unit 120 and functions to apply heat to the spin block unit 120. Here, the electric heater unit 140 generates heat of a temperature higher than a melting temperature (point) of the supplied polymer raw material. For example, the electric heater unit 140 applies heat of a temperature ranging from 50° C. to 350° C. to the spin block unit 120.

Thereby, when heat of a high temperature is applied to the spin block unit 120, the temperature of polymer raw materials that have been melted and transferred by the extruders 110 can be maintained constant at a uniform temperature higher than the melting temperatures until the polymer raw materials are transferred to the corresponding spinning nozzles.

As such, the electric heater unit 140 according to the present invention uses electricity to generate heat, unlike the conventional heating method which has used noxious material. Therefore, not only can the present invention enhance heat efficiency using high temperature but also can ensure the safety of workers because they are not exposed to noxious materials.

Although the first embodiment has been illustrated as using an electric heater, the present invention is not limited to this. If necessary, the conventional heating method may be used.

The cooling unit 150 is disposed below the spinning nozzle unit 130 and has a cooling device structure which uses either an air cooling method or a water cooling method depending on the thickness of a fiber 170 spun from the spinning nozzle unit 130. The cooling unit 150 functions to cool, using air or water, the fiber that has been spun by the spinning nozzle unit 130 after having been extruded at high temperature and high pressure.

If the thickness of the fiber spun from the spinning nozzle unit 130 is 30 denier or less, a cooling device that uses an air cooling method is selectively used as the cooling unit. If the thickness of the fiber spun from the spinning nozzle unit 130 is 30 denier or more, a cooling device that uses a water cooling method is selectively used as the cooling unit.

The height adjustment unit 160 of the present invention is fastened to opposite side surfaces of the spin block unit 120 and has an elevator structure which can move upwards and downwards. The height adjustment unit 160 is used to integrally or individually adjust the extruding unit 110, the spin block unit 120 and the spinning nozzle unit 130 so that the cooling unit 150 can be disposed below the spinning nozzle unit 130 regardless of the kind of cooling unit 150.

For example, when the cooling device that uses the water cooling method is provided below the spinning nozzle unit 130, because the cooling device that uses the water cooling method is larger than the cooling device that uses the air cooling method, it is required to adjust the heights of the extruding unit 110, the spin block unit 120 and the spinning nozzle unit 130 so that the water cooling type cooling device can be provided below the spin block unit 120 that is fixed. Here, the height adjustment unit 160 is used to adjust the heights of the extruding unit 110, the spin block unit 120 and the spinning nozzle unit 130. Therefore, in the first embodiment of the present invention, either cooling device that uses the air cooling method or the water cooling method can be used.

Second Embodiment

Figure 2:
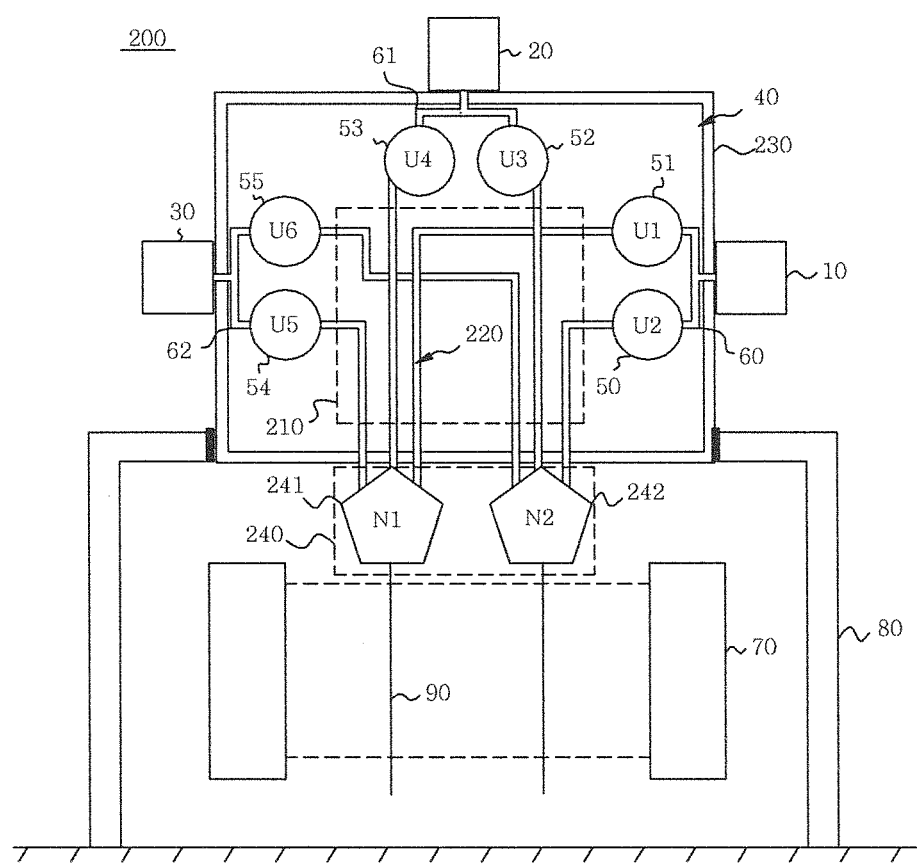
FIG. 2 is a view illustrating a multiple fiber spinning apparatus (200) provided with a multi-layered flow passage structure, according to a second embodiment of the present invention.

FIG. 2 is a view illustrating a multiple fiber spinning apparatus (200) provided with a multi-layered flow passage structure, according to a second embodiment of the present invention.

As shown in FIG. 2, the multiple fiber spinning apparatus 200 according to the second embodiment of the present invention includes a flow passage block unit 210, a flow passage unit 220, an electric heater unit 230 and a spinning nozzle unit 240. The multiple fiber spinning apparatus 200 further includes extruders 10, 20 and 30, a spin block unit 40, gear pumps 50, 51, 52, 53, 54 and 55, flow passages 60, 61 and 62 which are provided between the extruders 10, 20 and 30 and the gear pumps 50 to 55, a cooling unit 70 and a height adjustment unit 80.

Hereinafter, the extruding unit 10, 20 and 30, the spin block unit 40, the gear pumps 50 to 55 and the flow passages 60, 61 and 62 will be first explained, the flow passage block unit 210, the flow passage unit 220, the electric heater unit 230 and the spinning nozzle unit 240 which are significant elements of the present invention will be described, and then the cooling unit 70 and the height adjustment unit 80 will be explained.

First, the extruders 10, 20 and 30 of the present invention function to melt, extrude and transfer polymer raw materials that have been input into hoppers (not shown) disposed at the top of the apparatus. The extruders 10, 20 and 30 are disposed at different positions and receive polymer raw materials, extrude the polymer raw materials and then transfer them into the spin block unit 40 which will be explained later herein.

The spin block unit 40 of the present invention includes the gear pumps 50 to 55 and a flow passage unit 120 which will be explained later herein. The material of the spin block unit 40 is a metal alloy, but the present invention is not limited to this, and other materials can be used so long as their thermal conductivities are comparatively high.

The gear pumps 51 to 55 of the present invention are configured such that each extruder 10, 20, 30 is connected to a plurality of gear pumps. That is, the gear pumps 51 and 52 are disposed at the right side in the spin block unit 40 and connected, by the corresponding flow passage 60, to the extruder 10 that is disposed outside the right portion of the spin block unit 40. The gear pumps 53 and 54 are disposed at the upper portion in the spin block unit 40 and connected, by the corresponding flow passage 61, to the extruder 20 that is disposed outside the upper portion of the spin block unit 40. The gear pumps 54 and 55 are disposed at the left side in the spin block unit 40 and connected, by the corresponding flow passage 62, to the extruder 30 that is disposed outside the left portion of the spin block unit 40.

Figure 10:
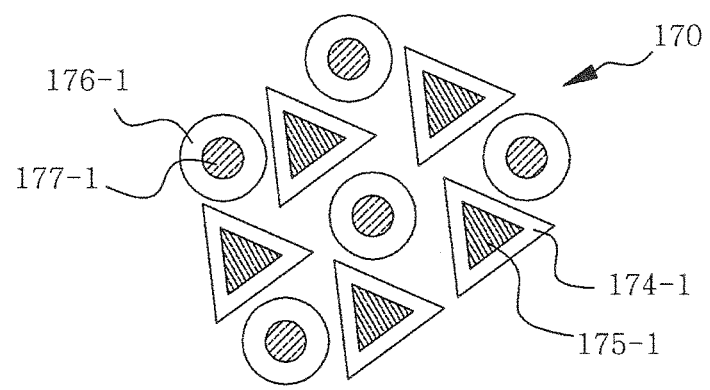

Each gear pump 53, 54 is configured such that it is connected to the corresponding flow passage and extruder so that molten and extruded polymer raw material can be supplied to the gear pump, and it is also connected to a gear motor (not shown in FIG. 10). Thanks to this connection configuration, the gear pumps 53 and 54 of the present invention can discharge polymer raw materials, which have been melted by and extruded from the extruders 10, 20 and 30, at the same or different discharge rates with the assistance of the gear motors. The words 'discharging materials at different discharge rates' means that the thicknesses of discharged fibers are different from each other.

As such, to overcome the structural limitations of the conventional melting fiber spinning apparatus (or the conjugate fiber spinning apparatus) in which a single extruder or each of two extruders must have only a single gear pump, in the second embodiment of the present invention, three or more extruders 30, 40 and 50 are provided, and each extruder 30, 40, 50 includes two gear pumps.

However, the present invention is not limited to the construction in which the extruders 30, 40 and 50 are provided and each extruder 30, 40, 50 has two gear pumps. In other words, a larger number of extruders and gear pumps may be provided, although the possibility of realization is low for structural reasons.

The flow passage block unit 210 of the present invention is a part of the spin block unit 40. The flow passage unit 220, which will be explained later herein, is formed in the flow passage block unit 210 of the spin block unit 40. The flow passage block unit 210 is preferably made of a metal alloy to enhance the heat transmission efficiency. In addition, another material can substitute for the alloy, if it is material that can transfer heat. The structure of the flow passage block unit 210 will be explained in more detail in the description of FIGS. 11 through 19.

The flow passage unit 220 of the present invention includes a plurality of flow passages which are provided in the spin block unit 40 and are individually connected to the corresponding gear pumps of the extruders 10, 20 and 30. The flow passages function as passages along which multiple kinds of molten polymers are transferred from the corresponding gear pumps 50, 51, 52, 53, 54 and 55. The structure of the flow passage unit 120 will be explained in more detail in the description of FIGS. 11 through 19.

The electric heater unit 230 of the present invention encloses the spin block unit 40 and functions to apply heat the spin block unit 40. Preferably, the electric heater unit 230 is configured such that it generates heat of a high temperature ranging from 50° C. to 350° C. and applies it to the flow passage block unit 210 of the spin block unit 220. The flow passage block unit 210 is made of a metal alloy so that high temperature heat can be easily transferred to polymers which are in the flow passage unit 220. Therefore, the polymers can be maintained in the molten state rather than being hardened while being transferred. Thus, the polymers can be rapidly transferred by the flow passage unit 220.

The spinning nozzle unit 240 includes a plurality of spinning nozzles, for example, two spinning nozzles 241 and 242. Each spinning nozzle 241, 242 is connected to corresponding ones of the gear pumps 50 to 55 by the corresponding flow passages.

For example, the N1 spinning nozzle 241 is connected to the U1 gear pump 51, the U4 gear pump 53 and the U5 gear pump 54 by the corresponding flow passages. The N2 spinning nozzle 242 is connected to the U2 gear pump 50, the U3 gear pump 52 and the U6 gear pump 55 by the corresponding flow passages.

Therefore, in the spinning nozzle unit 140 of the present invention, multiple kinds of polymers can be supplied to each spinning nozzle 241, 242 so that each spinning nozzle 241, 242 can spin the polymers into a fiber. A fiber 170 that is spun by each spinning nozzle 241, 242 and contains multiple kinds of polymers is wound around a roller (not shown).

The cooling unit 70 is disposed below the spinning nozzle unit 240 and has a cooling device structure which uses either an air cooling method or a water cooling method depending on the thickness of a fiber spun from the spinning nozzle unit 240. The cooling unit 70 functions to cool, using air or water, the fiber that has been spun by the spinning nozzle unit 240 after having been extruded at high temperature and high pressure.

Preferably, if the thickness of the fiber spun from the spinning nozzle unit 240 is 30 denier or less, a cooling device that uses an air cooling method is selectively used as the cooling unit 70. If the thickness of the fiber spun from the spinning nozzle unit 240 is 30 denier or more, a cooling device that uses a water cooling method is selectively used as the cooling unit 70.

The height adjustment unit 80 of the present invention is fastened to opposite side surfaces of the spin block unit 40 and has an elevator structure which can move upwards and downwards. The height adjustment unit 80 is used to adjust the extruders 10, 20 and 30, the spin block unit 40 and the spinning nozzle unit 140 so that the cooling unit 70 can be disposed below the spinning nozzle unit 140 regardless of the kind of cooling unit 70 that is used.

For example, when the water cooling type cooling unit 70 is provided below the spinning nozzle unit 240, because the cooling device structure that uses the water cooling method is larger than the cooling device structure that uses the air cooling method, the heights of the extruders 10, 20 and 30, the spin block unit 40 and the spinning nozzle unit 240 must be adjusted so that the water cooling type cooling unit 70 can be provided below the spin block unit 40, which is fixed. Here, the height adjustment unit 80 is used to adjust the heights of the extruders 10, 20 and 30, the spin block unit 40 and the spinning nozzle unit 240. Therefore, in the second embodiment of the present invention, a cooling device structure that uses either the air cooling method or the water cooling method can be used.

Thanks to such a structure, the second embodiment can produce a variety of types of fibers 90, not only a multiple conjugate fiber (a multiple conjugate yarn) but also an intermingled fiber (a intermingled yarn).

Mode for Invention

Hereinafter, given the physical structures of the gear pump unit 120A and the spinning nozzle unit 130 of the multiple fiber spinning apparatus according to the first embodiment of the present invention, a method of controlling the gear pump unit 120A and/or the spinning nozzle unit 130 and a fiber produced by the apparatus will be explained in detail with reference to FIGS. 3 through 10.

Example of the Method of Controlling the Multiple Fiber Spinning Apparatus

Figure 3:
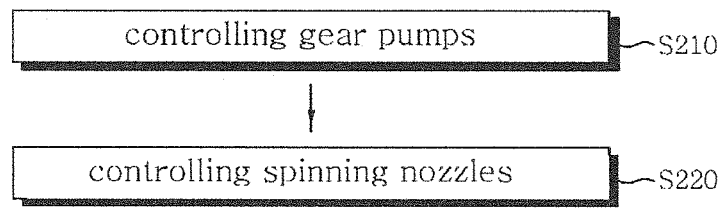
FIG. 3 is a flowchart of a method of controlling the multiple fiber spinning apparatus (100) according to the first embodiment of the present invention.

FIG. 3 is a flowchart of the method of controlling the multiple fiber spinning apparatus 100 according to the first embodiment of the present invention.

As shown in FIG. 3, the method S200 of controlling the multiple fiber spinning apparatus 100 according to the first embodiment of the present invention is provided to control the gear pumps 120A and the spinning nozzles 130 in such a way that each spinning nozzle 131 or 132 which is connected to the corresponding one of the gear pumps 120A of each extruder 110 receives multiple kinds of molten polymers, which have been discharged from the corresponding gear pumps 120A at the same or different discharge rates, and then spins the polymers into a fiber.

To achieve the above purposes, the method S200 of controlling the multiple fiber spinning apparatus 100 according to the first embodiment of the present invention includes step S210 of controlling the gear pumps 120A so that the gear pumps 120A of each extruder 110 discharge, at the same or different discharge rates, polymer which has been melted by and transferred from the corresponding extruder 110, and step S220 of controlling each spinning nozzle 131 or 132, which is connected to the corresponding one of the gear pumps 120A of each extruder 110, so that each spinning nozzle 131 or 132 receives multiple kinds of molten polymers from the corresponding gear pumps 120A and then spins the polymers into a fiber.

Because the gear pump 120A and/or the spinning nozzle unit 130 are controlled, the present invention can produce at least one of either a multiple conjugate fiber (a multiple conjugate yarn) or a intermingled fiber (a intermingled yarn) or can produce both at the same time. An example of producing the multiple conjugate fiber will be explained in detail with reference to FIGS. 4 and 7, and an example of producing the intermingled fiber will be described in detail with reference to FIGS. 8 through 10.

Example of the Multiple Conjugate Fiber

Figure 4:
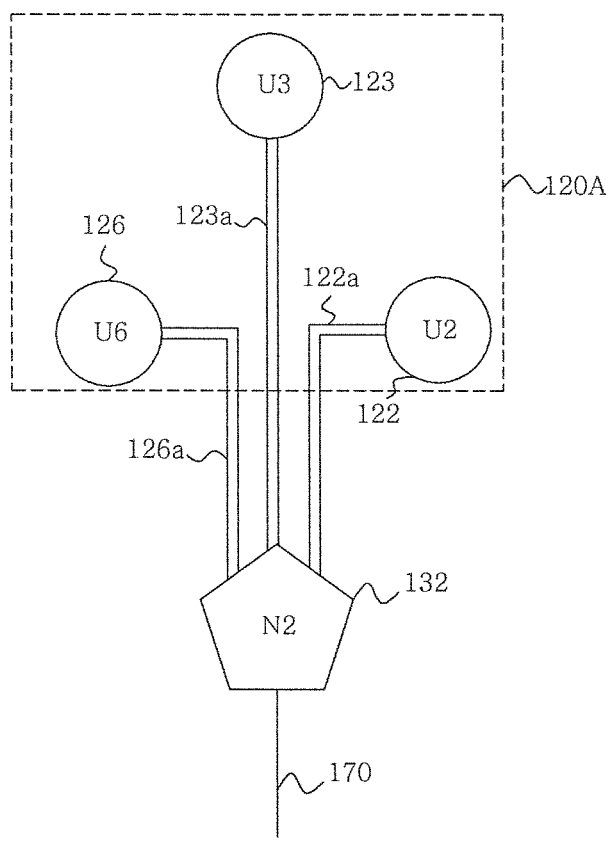
FIG. 4 is a view showing the construction of a gear pump (120A) and a spinning nozzle unit (130) which must be controlled to produce a multiple conjugate fiber according to the first embodiment of the present invention.
Figure 5:
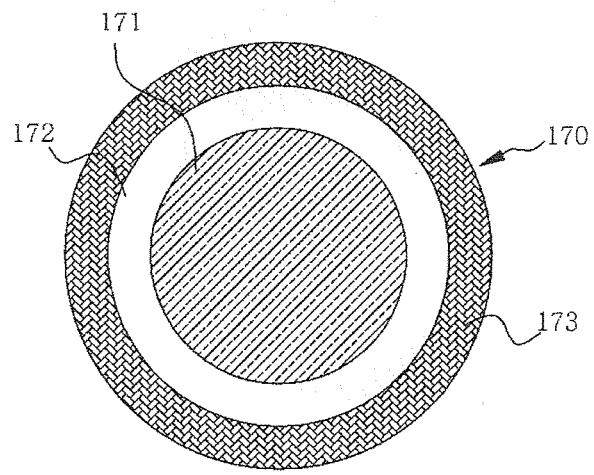
FIGS. 5 through 7 are views illustrating examples of the cross-sectional shape of a multiple conjugate fiber (170) produced by the control method of FIG. 4 of the present invention.
Figure 6:
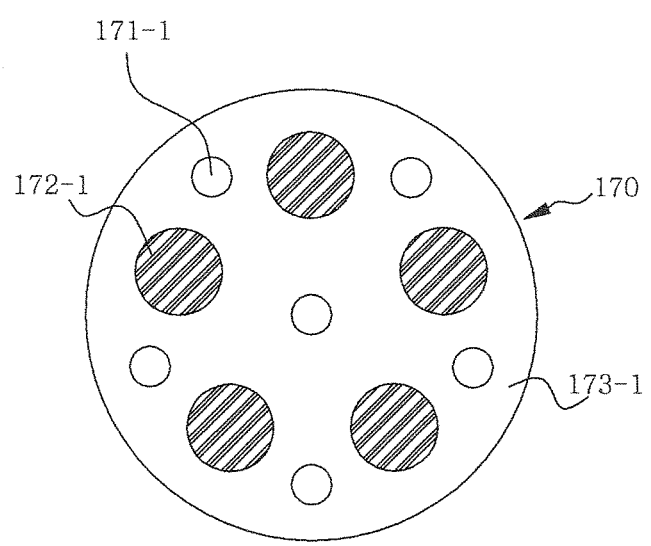
Figure 7:
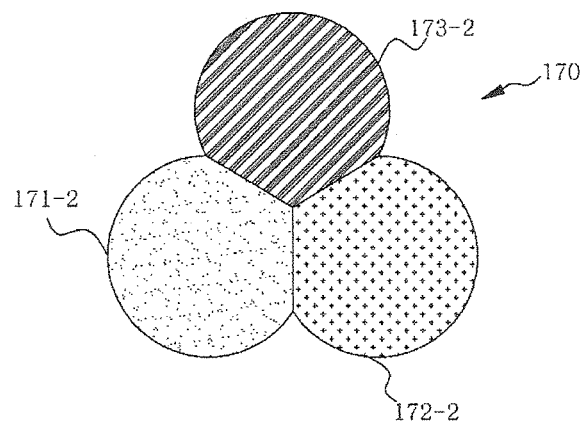

FIG. 4 is a view showing the construction of the gear pump unit 120A and the spinning nozzle unit 130 which must be controlled to produce a multiple conjugate fiber according to the first embodiment of the present invention. FIGS. 5 through 7 are views illustrating examples of the cross-sectional shape of a multiple conjugate fiber 170 produced by the control method of FIG. 4 of the present invention.

FIG. 4 illustrates the gear pumps 122, 123 and 126 of the gear pump unit 120A and the spinning nozzle 132 which are targets of control, and the flow passages 122$a$, 123$a$ and 126$a$ which are provided therebetween. Here, in an embodiment, it is supposed that the gear pumps 122, 123 and 126 discharge different kinds of polymers.

That is, the method of controlling the multiple fiber spinning apparatus 100 according to this embodiment of the present invention includes controlling the three gear pumps 122, 123 and 126 and/or the single spinning nozzle 132 so that the spinning nozzle 132 which is connected to the gear pumps 122, 123 and 126 can spin three kinds of polymers into a fiber in a predetermined pattern.

FIGS. 5 through 7 show examples of the multiple conjugate fiber (the multiple conjugate yarn, 170) produced using the three kinds of polymers in a predetermined pattern. The multiple conjugate fiber 170 of FIG. 5 is an example of a multiple conjugate fiber that contains three kinds of polymers 171, 172 and 173 and has a sheath-core type cross-section. FIG. 6 shows a multiple conjugate fiber 170 that has a sea-islands type cross-section in which three kinds of polymers 171-1, 172-1 and 173-1 are arranged in a regular pattern.

FIG. 7 shows the cross-sectional shape of a side-by-side type multiple conjugate fiber 170 in which three kinds of polymers 171-2, 172-2 and 173-2 are arranged based on the center to form a partitioned shape.

As can be understood by looking at FIGS. 5 through 7, the present invention can produce different types of multiple conjugate fibers in such a way as to control the gear pumps and the spinning nozzle connected to the gear pumps. However, the present invention is not limited to this structure. For instance, the present invention may be configured such that several spinning nozzles connected to the gear pumps are controlled at the same time and each spinning nozzle produces a different type of multiple conjugate fiber.

Example of the Intermingled Fiber

Figure 8:
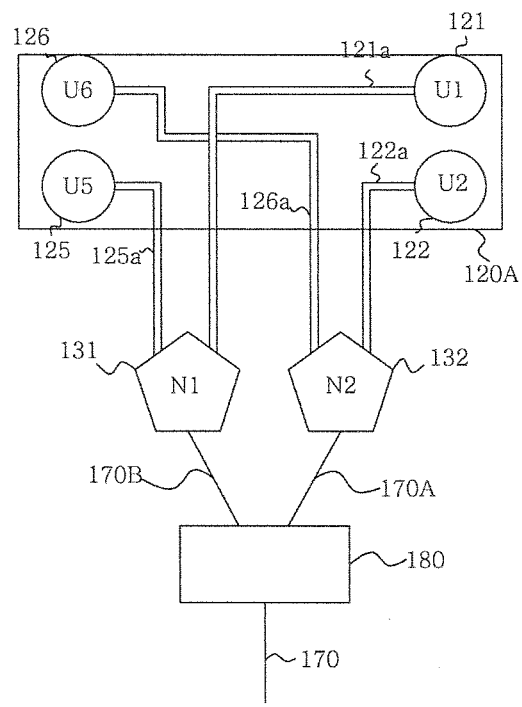
FIG. 8 is a view showing the construction of a gear pump (120A) and a spinning nozzle unit (130) which must be controlled to produce an intermingled fiber according to the first embodiment of the present invention.
Figure 9:
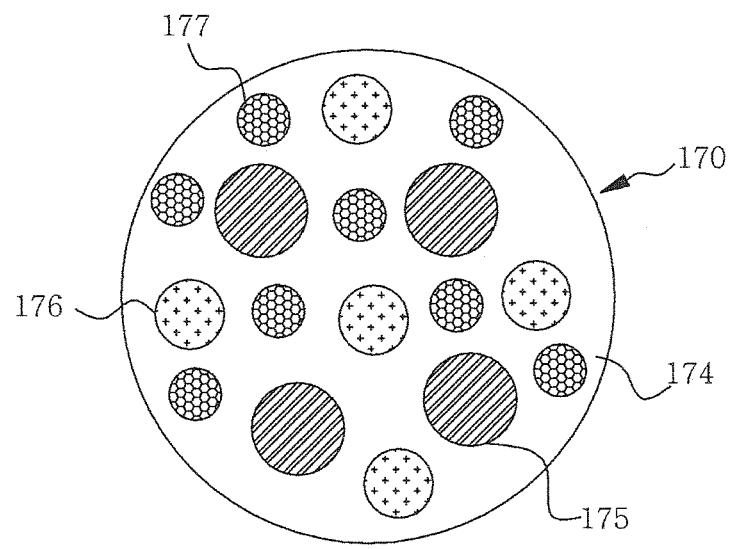
FIGS. 9 and 10 are views illustrating examples of the cross-sectional shape of an intermingled fiber (170) produced by the control method of FIG. 8 of the present invention.

FIG. 8 is a view showing the construction of a gear pump 120A and a spinning nozzle unit 130 which must be controlled to produce an intermingled fiber according to the first embodiment of the present invention. FIGS. 9 and 10 are views illustrating examples of the cross-sectional shape of an intermingled fiber 170 produced by the control method of FIG. 8 of the present invention.

FIG. 8 illustrates the gear pumps 121, 122, 125 and 126 of the gear pump unit 120A and the spinning nozzles 131 and 132 which are targets of control, and the flow passages 121$a$, 122$a$, 125$a$ and 126$a$ which are provided therebetween. Here, in an embodiment, it is supposed that the gear pumps 121, 122, 125 and 126 discharge different kinds of polymers.

That is, the method of controlling the multiple fiber spinning apparatus 100 according to this embodiment of the present invention includes controlling the four gear pumps 121, 122, 125 and 126 and/or the two spinning nozzles 131 and 132 so that the N1 spinning nozzle 131 connected to the U1 and U5 gear pumps 121 and 125 and the N2 spinning nozzle 132 connected to the U2 and U6 gear pumps 122 and 126 can spin two kinds of fibers 170A and 170B that have different thicknesses at the same time.

The fibers spun from the spinning nozzles 131 and 132 are intermingled in an irregular pattern by an interlacing nozzle or air-texturizing nozzle 180, thus forming an intermingled fiber (an intermingled yarn, 170) in which two to four kinds of fiber materials that have different thicknesses are arranged in an irregular pattern. The interlacing nozzle or air-texturizing nozzle 180 is well known, so that further explanation thereof will be omitted.

FIGS. 9 and 10 shows examples of the intermingled fiber 170 produced by the above-mentioned method. FIG. 9 shows an example of the intermingled fiber 170 in which four kinds of fiber materials 174, 175, 176 and 177 are intermingled in an irregular pattern by the two spinning nozzles and the interlacing nozzle or the air-texturizing nozzle. FIG. 10 shows an example of the intermingled fiber 170 in which a circular sheath-core type conjugate fiber produced by two kinds of polymer materials 174-1 and 175-1 and a triangular sheath-core type conjugate fiber produced by two other kinds of polymer materials 176-1 and 177-1 are intermingled, in other words, two kinds of conjugate fibers are arranged in an irregular pattern different from that of FIG. 9.

If both the N1 spinning nozzle 131 and the N2 spinning nozzle 132 of FIG. 8 are controlled, more than two multiple kinds, e.g. four kinds of polymers can be spun at the same time to produce an intermingled fiber 170 which is irregularly patterned. As such, controlling the two spinning nozzles can facilitate producing an intermingled fiber rather than producing a conjugate fiber. However, the intermingled fiber may be produced by controlling only the single spinning nozzle.

Hereinafter, because it is not easy to provide a plurality of flow passages, a method of forming a plurality of flow passages in the flow passage block unit 210 according to the second embodiment of the present invention will be described with reference to FIGS. 11 through 19.

Example of Application of a Single Flow Passage Unit 220

Figure 11:
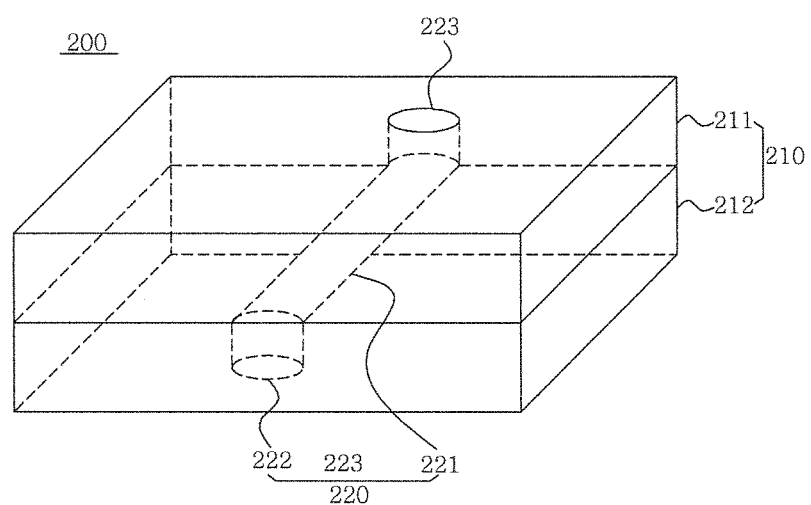
FIG. 11 is a view showing the structure of a multi-layered flow passage block unit (210) provided with a single flow passage (220) according to the second embodiment of the present invention.
Figure 12:
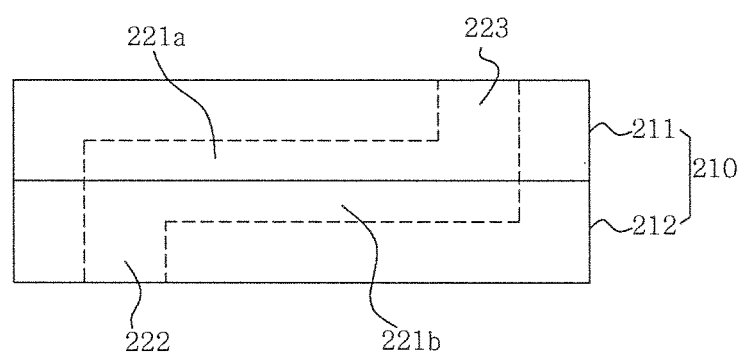
FIG. 12 is a front view of the multi-layered flow passage block unit (210) of FIG. 11 according to the second embodiment of the present invention.
Figure 13:
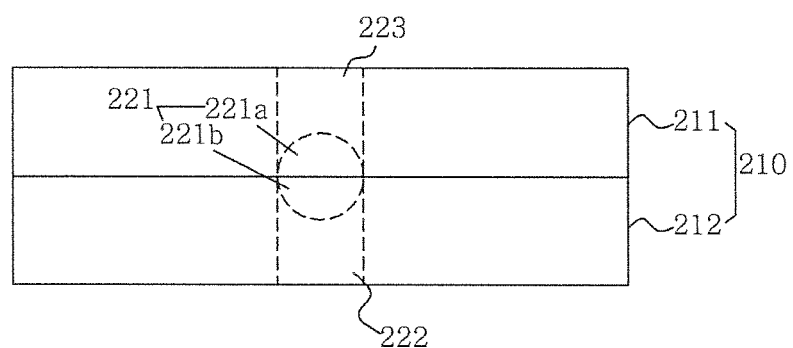
FIG. 13 is a right side view of the multi-layered flow passage block unit (210) of FIG. 11 according to the second embodiment of the present invention.

FIG. 11 is a view showing the structure of a multi-layered flow passage block unit 210 provided with a single flow passage unit 220 according to the second embodiment of the present invention. FIG. 12 is a front view of the multi-layered flow passage block unit 210 of FIG. 11 according to the second embodiment of the present invention. FIG. 13 is a right side view of the multi-layered flow passage block unit 210 of FIG. 11 according to the second embodiment of the present invention.

As shown in the drawings, the flow passage block unit 210 is made of material such as a metal alloy and has a multi-, e.g., two-layered structure. Although a plurality of flow passage units 220 may be formed in the flow passage block unit 210, in this example, only a single flow passage unit 220 is illustrated for the sake of understanding how the flow passage unit 220 is formed in the flow passage block unit 210.

The flow passage block unit provided with the single flow passage unit 220 will be described below. The flow passage unit 220 of the present invention is configured such that it is formed in the junction between the flow passage blocks 211 and 212 and forms openings that are respectively vertically formed in the flow passage blocks 211 and 212. For example, the flow passage block unit 210 is divided into a first flow passage block 211 and a second flow passage block 212. The flow passage unit 220 is divided into a first flow passage 221, a second flow passage 223 and a third flow passage 222. The first flow passage 221 is divided into a first-first flow passage 221a and a second-first flow passage 221b. In this case, in the junction between the first flow passage block 211 and the second flow passage block 212, the semicircular first-first flow passage 221a is formed in the first flow passage block 211, and the semicircular second-first flow passage 221b is formed in the second flow passage block 212.

Furthermore, with regard to the upper and lower openings of the first and second flow passage blocks 211 and 212, the circular third flow passage 223 extends from the first-first flow passage 221a and is vertically formed through the first flow passage block 211, thus referring to the opening of the first flow passage block 211. In the opening of the second flow passage block 212, the circular fourth flow passage 222 extends from the second-first flow passage 221b and is vertically formed through the second flow passage block 212.

The flow passages 221, 222 and 223 are formed by forming depressions in the flow passage blocks 211 and 212 and placing the flow passage block 211 on the flow passage block 212. After the flow passage block 211 has been placed on the flow passage block 212, the flow passage blocks 211 and 212 are fixed to each other, thus completing formation of the flow passage block unit 220.

As stated above, in the examples according to the second embodiment of the present invention that are provided to improve the conventional technique in which the single or the two flow passages are formed in the shape of a pipe, the flow passages 220 are formed by forming depressions in the flow passage block unit 210, thus making it easy to apply the electric heater unit 230.

Example of Application of Two Flow Passages 220A and 220B

Figure 14:
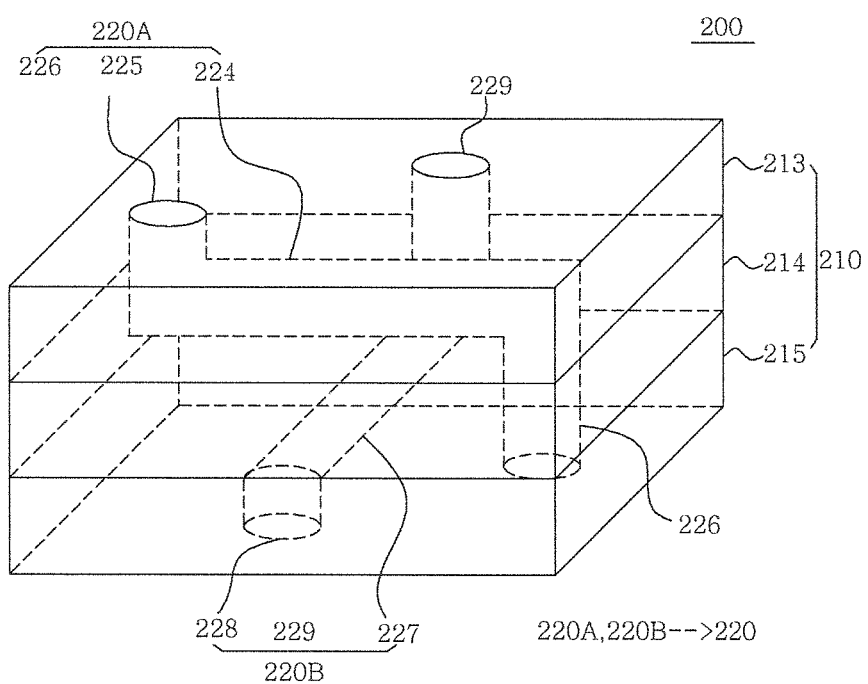
FIG. 14 is a view showing the structure of a multi-layered flow passage block unit (210) provided with two flow passages (220A) and (220B) according to the second embodiment of the present invention.
Figure 15:
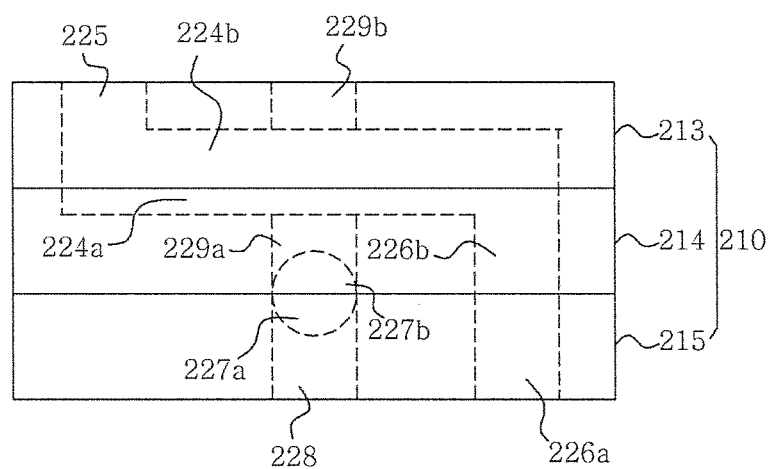
FIG. 15 is a front view of the multi-layered flow passage block unit (210) of FIG. 14 according to the second embodiment of the present invention.
Figure 16:
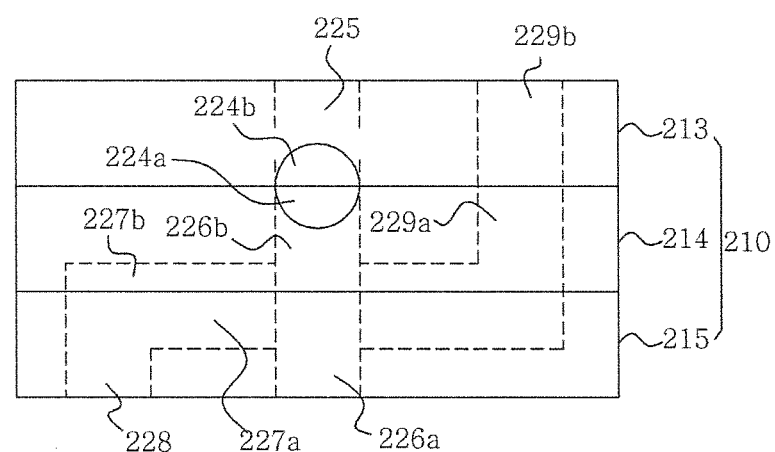
FIG. 16 is a right side view of the multi-layered flow passage block unit (210) of FIG. 14 according to the second embodiment of the present invention.
Figure 17:
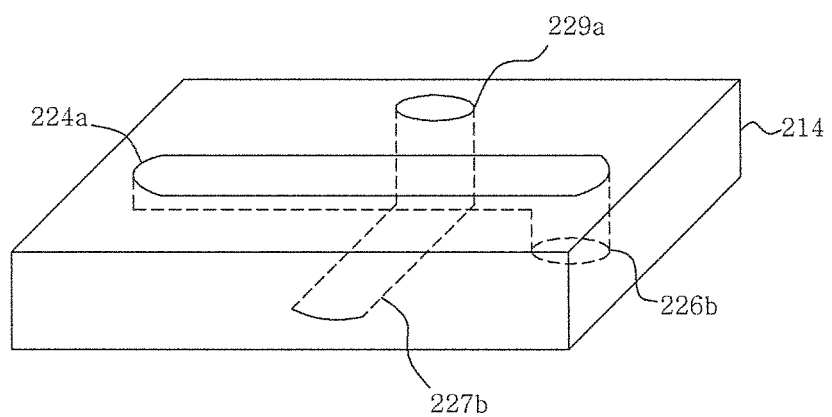
FIGS. 17, 18 and 19 are respectively a sectional view, a front view and a right side view showing a medial flow passage block (214) of the multi-layered flow passage block unit (210) provided with two flow passages (220A) and (220B) according to the second embodiment of the present invention.
Figure 18:
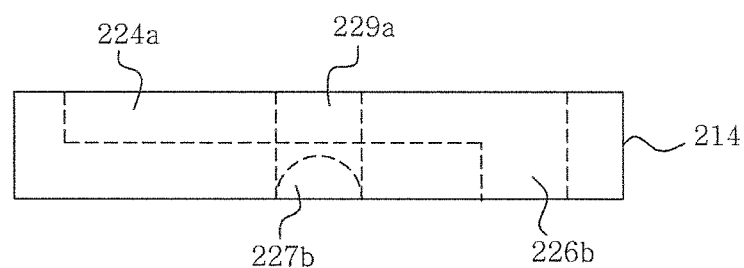
Figure 19:
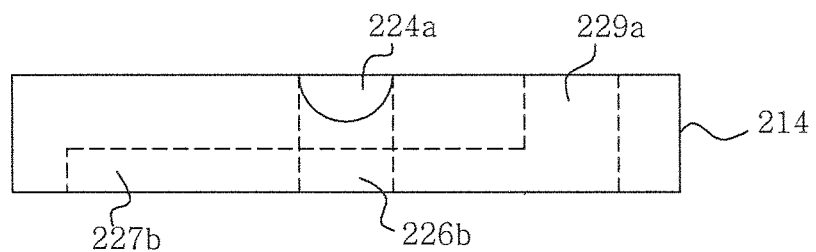

FIG. 14 is a view showing the structure of a multi-layered flow passage block unit 210 provided with two flow passages 220A and 220B according to the second embodiment of the present invention. FIG. 15 is a front view of the multi-layered flow passage block unit 210 of FIG. 14 according to the second embodiment of the present invention. FIG. 16 is a right side view of the multi-layered flow passage block unit (210) of FIG. 14 according to the second embodiment of the present invention. FIGS. 17, 18 and 19 are respectively a sectional view, a front view and a right side view showing a medial flow passage block 214 of the multi-layered flow passage block unit 210 provided with two flow passages 220A and 220B according to the second embodiment of the present invention.

As shown in the drawings, the flow passage block unit 210 of the present invention is preferably made of a material such as a metal alloy and has a multi-, e.g., three-layered structure. A plurality of flow passages 220, for example, two flow passages 220A and 220B, are formed in the flow passage block unit 210.

The two flow passages 220A and 220B are configured such that they are formed in the junctions between the flow passage blocks 213, 214 and 215 and form openings which are vertically formed through the flow passage blocks.

For instance, the flow passage block unit 210 of the present invention is divided into a first flow passage block 213, a second flow passage block 214 and a third flow passage block 215. The flow passage unit 220 is divided into a first flow passage unit 220A and a second flow passage 220B. The first flow passage unit 220A is divided into a first flow passage 224, a second flow passage 225 and a third flow passage 226. The second flow passage unit 220B is divided into a fourth flow passage 227, a fifth flow passage 228 and a sixth flow passage 229. In the junction between the first flow passage block 213 and the second flow passage block 214, a first-first flow passage 224a of the first flow passage 224 is formed in the second flow passage block 214, while a second-first flow passage 224b of the first flow passage 224 is formed in the first flow passage block 213 at a position corresponding to the first-first flow passage 224a.

The second flow passage 225 extends from the first flow passage 224 and is vertically formed through the first flow passage block 213. The third flow passage 226 extends from the second flow passage 224 and is vertically formed through the second flow passage block 214 and the third flow passage block 215.

In the junction between the second flow passage block 214 and the third flow passage block 215, a first-fourth flow passage 227a of the fourth flow passage 227 is formed in the third flow passage block 215, while the second-fourth flow passage 227b of the fourth flow passage 227 is formed in the second flow passage block 214 at a position corresponding to the first-fourth flow passage 227a.

The fifth flow passage 228 extends from a first end of the fourth flow passage 227 and is vertically formed through the third flow passage block 215. The sixth flow passage 229 extends from a second end of the fourth flow passage 227 and is vertically formed through the first flow passage block 213 and the second flow passage 214.

As stated above, the first flow passage unit 220A and the second flow passage unit 220B of the present invention can be formed between the layered flow passage blocks 213, 214 and 215 and be vertically formed in the flow passage block unit 210 without making contact with each other. In the same manner, it can be appreciated that an increased number of flow passages can be formed, which do not make contact with each other, between the gear pumps and the spinning nozzles than there are shown in FIG. 10.

Third Embodiment

Figure 20:
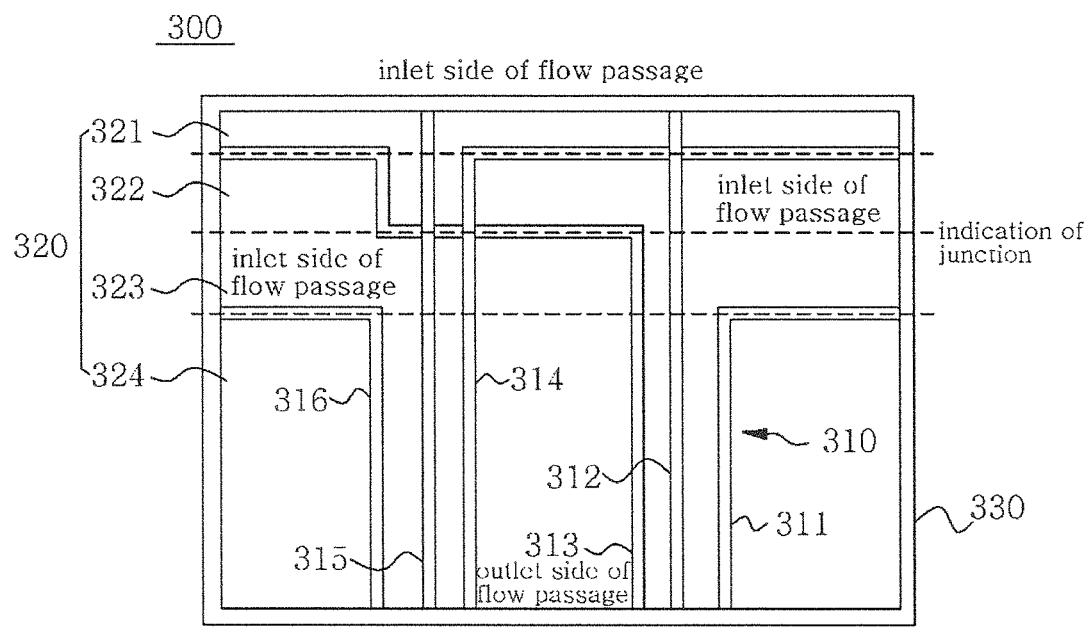
FIG. 20 is a view illustrating a multiple fiber spinning apparatus (300) provided with a multi-layered flow passage structure, according to a third embodiment of the present invention.

FIG. 20 is a view illustrating a multiple fiber spinning apparatus 300 provided with a multi-layered flow passage structure, according to a third embodiment of the present invention.

As shown in FIG. 20, the multiple fiber spinning apparatus 300 according to the third embodiment of the present invention includes a, flow passage unit 310, a flow passage block unit 320 and an electric heater unit 330.

The flow passage unit 310 includes a plurality of flow passages 311, 312, 313, 314, 315 and 316 and functions to transfer high-temperature and high-pressure fluid. Devices for generating high-temperature and high-pressure fluid are provided at an inlet side of the flow passage unit 310 and are connected to the respective flow passages or respective flow passage groups, each of which includes a predetermined number of flow passages. For instance, devices which produce polymers related to the formation of films or sheets may be provided. On the other hand, devices for forming desired products using the high-temperature and high-pressure fluid are provided at an outlet side of the flow passage unit 310.

The flow passage block unit 320 of the present invention encloses the flow passage unit 310. For example, the flow passages 311, 312, 313, 314, 315 and 316 are formed in an internal space of the flow passage block unit 320 in such a way that the ends of each flow passage are flush with the surface of the flow passage block unit 320. The flow passage block unit 320 is configured such that several blocks are stacked on top of another, for example, a first flow passage block 321, a second flow passage block 322, a third flow passage block 323 and a fourth flow passage block 324 are stacked to form a four-layered structure.

In this embodiment, the flow passage unit 310 formed in the flow passage block unit 320 is divided into a first flow passage 311, a second flow passage 312, a third flow passage 313, a fourth flow passage 314, a fifth flow passage 315 and a sixth flow passage 316. Here, a portion of the second flow passage 311 is formed in a circular shape in the junction between the fourth flow passage block 324 and the third flow passage block 323, and the other portion of the second flow passage 311 extends from it and is vertically formed through the fourth flow passage block 324.

In the same manner, a portion of each of the second flow passage 312, the third flow passage 313 and the fourth flow passage 314 is formed in the junction between the corresponding flow passage blocks, and the other portion extends from it and is vertically formed through the corresponding flow passage block or flow passage blocks. This mechanism is the same as that of the flow passage unit 220 and the flow passage block unit 210 that are illustrated with reference to FIGS. 11 through 19, so that a further detailed explanation will be omitted. This embodiment is also configured such that the flow passages 311 to 316 are formed in the flow passage block unit 320 without being put in contact with each other.

The electric heater unit 330 of this embodiment of the present invention generates heat of a temperature ranging from 50° C. to 350° C. and applies it to the flow passage block unit 320. Because the flow passage block unit 320 is made of a metal alloy that has high thermal conductivity, heat can be easily transferred to the flow passage unit 310 via the flow passage block unit 320. The heat that is transferred to the flow passage unit 310 can rapidly melt polymers that are drawn into the flow passage unit 310 and prevent the polymers from becoming hardened.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. A multiple fiber spinning apparatus, comprising:
an extruding unit comprising a plurality of extruders for melting polymer materials supplied into hoppers and then extruding and transferring the polymer materials, wherein each extruder extrudes and transfers the polymer materials into a respective plurality of flow passages;
a spin block unit, comprising a gear pump unit comprising a plurality of gear pumps connected to the extruders, wherein at least two gear pumps are connected to each of the extruders, the gear pumps being provided for receiving the polymer materials from the corresponding extruders of the extruding unit and for discharging the polymer materials at a same discharge rate or different discharge rates; and a flow passage unit comprising the plurality of flow passages connected to the respective gear pumps of the gear pump unit for transferring the molten polymer materials through the flow passages; and
a spinning nozzle unit comprising a plurality of spinning nozzles, wherein each of said spinning nozzles is connected to one of the gear pumps of each of the extruders by the corresponding flow passage for each of the spinning nozzles to receive the multiple kinds of molten polymer materials and to spin the polymer materials into a fiber.

2. The multiple fiber spinning apparatus according to claim 1, further comprising an electric heater unit for enclosing the spin block unit and applying heat to the spin block unit.

3. The multiple fiber spinning apparatus according to claim 2, wherein the electric heater unit is provided for generating heat of a temperature ranging from 50° C. to 350° C. and applying the heat to the spin block unit.

4. The multiple fiber spinning apparatus according to claim 1, further comprising a cooling unit provided below the spinning nozzle unit, the cooling unit being provided for either using an air cooling method or using a water cooling method depending on a thickness of a fiber spun from the spinning nozzle unit.

5. The multiple fiber spinning apparatus according to claim 4, further comprising a height adjustment unit for adjusting heights of the extruding unit, the spin block unit and the spinning nozzle unit so that the corresponding cooling unit using either cooling method can be provided below the spinning nozzle unit.

6. A multiple fiber spinning apparatus having a multi-layered flow passage structure, comprising:
an extruding unit comprising a plurality of extruders for melting polymer materials supplied into hoppers and then extruding and transferring the polymer materials, wherein each extruder extrudes and transfers the polymer materials into a plurality of flow passages;
a flow passage unit comprising the plurality of flow passages individually formed in a spin block unit and connected to respective gear pumps of extruders, wherein at least two gear pumps are connected to each of the extruders, wherein at least two gear pumps are connected to each of the extruders, for transferring molten polymer materials from the corresponding gear pumps through the flow passages;
an electric heater unit for enclosing the spin block unit and applying heat to the spin block unit; and
a spinning nozzle unit comprising a plurality of spinning nozzles, wherein each of said spinning nozzles is connected to the corresponding gear pumps by the corresponding flow passages so that each of the spinning nozzles receives multiple kinds of molten polymer materials and spins the polymer materials into a fiber,
wherein a plurality of flow passage blocks are stacked on top of another in the spin block unit that encloses the flow passage unit, wherein the flow passages are formed in a junction between the flow passage blocks and form openings which are vertically formed through the flow passage blocks, and wherein opposite ends of each of the flow passages are respectively connected to the corresponding gear pump and the corresponding spinning nozzle.

7. The multiple fiber spinning apparatus according to claim 6, wherein each of the flow passage blocks is made of a metal alloy.

8. The multiple fiber spinning apparatus according to claim 6, wherein the electric heater unit generates heat of a temperature ranging from 50° C. to 350° C. and applies the heat to the flow passage blocks in the spin block unit.

9. The multiple fiber spinning apparatus according to claim 6, wherein the flow passages are formed in the passage blocks without making contact with each other.

10. A multiple fiber spinning apparatus, comprising:
an extruding unit comprising a plurality of extruders for melting polymer materials supplied into hoppers and then extruding and transferring the polymer materials, wherein each extruder extrudes and transfers the polymer materials into a plurality of flow passages;
a flow passage unit comprising the plurality of flow passages individually formed in a spin block unit and connected to respective gear pumps of extruders, wherein at least two gear pumps are connected to each of the extruders, for transferring molten polymer materials from the corresponding gear pumps through the flow passages;
a flow passage block unit enclosing the flow passage unit, the flow passage block unit having a structure in which a plurality of flow passage blocks are stacked on top of another; and
an electric heater unit for applying heat to the flow passage block unit to melt polymer materials supplied into the flow passage unit,
wherein the flow passages are formed in a junction between the flow passage blocks and form openings which extend from the junction and are vertically formed through the flow passage blocks, for transferring the fluid through the flow passages.

11. The multiple fiber spinning apparatus according to claim 10, wherein the flow passage block is made of a metal alloy.

12. The multiple fiber spinning apparatus according to claim 10, wherein the electric heater unit generates heat of a temperature ranging from 50° C. to 350° C. and transfers the heat to the flow passage block unit.

13. The multiple fiber spinning apparatus according to claim 10, wherein the flow passages are formed in the passage blocks without making contact with each other.

* * * * *